(12) United States Patent
Smith et al.

(10) Patent No.: US 10,625,394 B1
(45) Date of Patent: Apr. 21, 2020

(54) BLADE STOP DEVICES AND METHODS

(71) Applicants: Michael P. Smith, Timpson, TX (US);
Marco A. Madrid, Timpson, TX (US)

(72) Inventors: Michael P. Smith, Timpson, TX (US);
Marco A. Madrid, Timpson, TX (US)

(73) Assignee: Smith Sawmill Service LLC, Timpson, TX (US)

( * ) Notice: Subject to any disclaimer, the term of this patent is extended or adjusted under 35 U.S.C. 154(b) by 285 days.

(21) Appl. No.: 15/889,391

(22) Filed: Feb. 6, 2018

(51) Int. Cl.
*B24B 41/06* (2012.01)
*B23D 63/12* (2006.01)

(52) U.S. Cl.
CPC .............. *B24B 41/06* (2013.01); *B23D 63/12* (2013.01)

(58) Field of Classification Search
CPC ....... B24B 41/06; B24B 41/066; B23D 63/12; B23D 63/14
USPC ................................... 451/45, 234, 242, 293
See application file for complete search history.

(56) References Cited

U.S. PATENT DOCUMENTS

| | | | | |
|---|---|---|---|---|
| 535,721 A * | 3/1895 | Newton | ................. | B23D 63/12 76/39 |
| 2,959,989 A * | 11/1960 | Ebert | ...................... | B23D 63/14 76/77 |
| 3,657,946 A * | 4/1972 | Idel | ...................... | B23D 63/005 76/112 |
| 4,819,515 A * | 4/1989 | Pfaltzgraff | ........... | B23D 63/005 451/17 |
| 5,038,639 A * | 8/1991 | Emter | .................. | B23D 63/005 76/112 |
| 5,320,293 A * | 6/1994 | Laly | ....................... | B02C 18/145 241/189.1 |
| 5,321,912 A * | 6/1994 | Neary | ....................... | B24B 3/42 451/141 |
| 6,109,137 A * | 8/2000 | Lenard | .................. | B23D 63/005 451/65 |
| 6,379,218 B1* | 4/2002 | Bailer | .................... | B23D 63/00 451/56 |
| 6,881,137 B2* | 4/2005 | Friel, Sr. | ................. | B24D 15/08 451/193 |
| 7,140,948 B2* | 11/2006 | Lenard | ................... | B23D 63/12 451/11 |
| 7,207,865 B2* | 4/2007 | Bailer | .................. | B23D 63/001 451/10 |
| 7,934,978 B2* | 5/2011 | Wilson | .................... | B24B 3/003 451/293 |
| 9,233,428 B2* | 1/2016 | Williams | ............ | B24B 27/0076 |

(Continued)

*Primary Examiner* — George B Nguyen
(74) *Attorney, Agent, or Firm* — R. Keith Harrison

(57) ABSTRACT

Blade stop devices for stopping a sawblade at a predetermined stopping point relative to a grinding disk on a grinding tool of a sawblade grinding machine include a device mount frame configured for mounting with respect to the grinding disk on the grinding tool of the sawblade grinding machine. A carriage rail may be provided on the device mount frame. A blade stop carriage may be adjustable along the carriage rail between a home position and a blade stop position. A blade stop arm may include an arm base carried by the blade stop carriage and a blade stop flange carried by the arm base. Methods of stopping a sawblade at a predetermined stopping point relative to a grinding disk on a grinding tool of a sawblade grinding machine to facilitate consistent removal of a desired quantity or thickness of material from blade teeth on different sawblades are also disclosed.

20 Claims, 14 Drawing Sheets

(56) References Cited

U.S. PATENT DOCUMENTS

| | | | |
|---|---|---|---|
| 2010/0203808 A1* | 8/2010 | Hout | B24B 3/38 451/28 |
| 2011/0237166 A1* | 9/2011 | Chang | B23D 63/005 451/279 |

\* cited by examiner

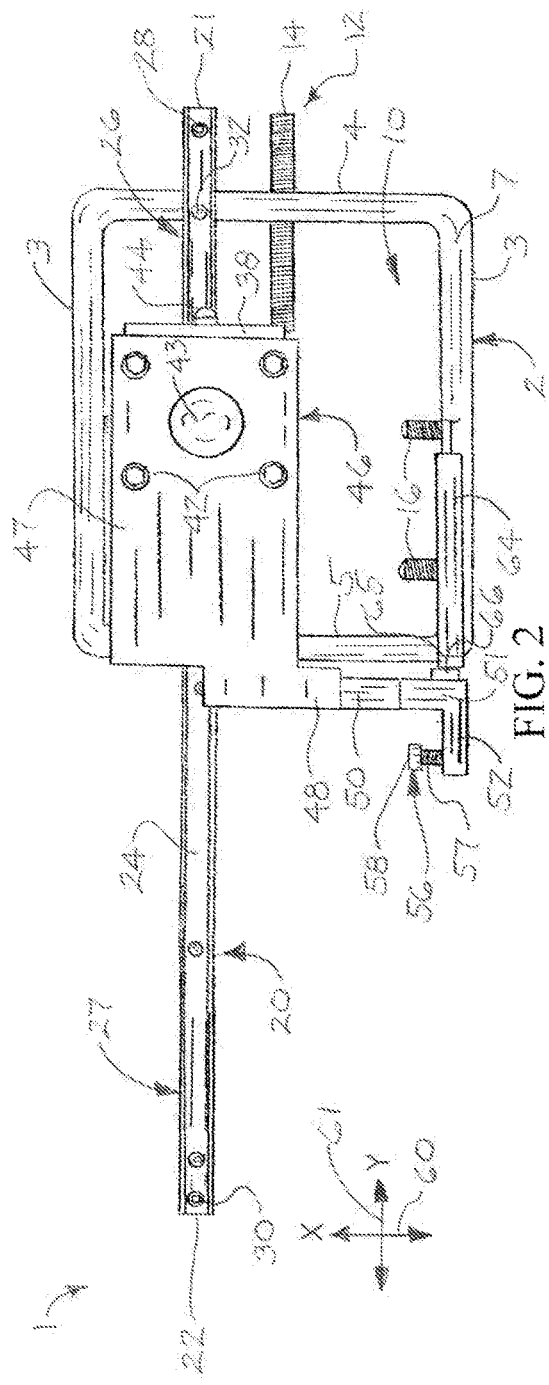

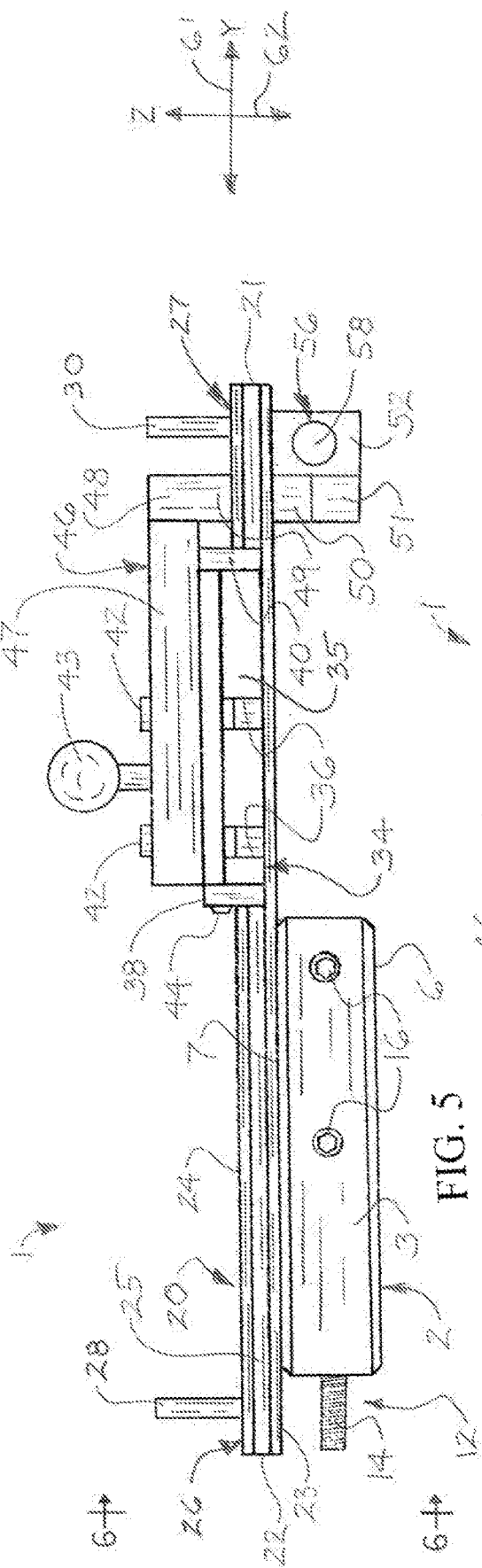
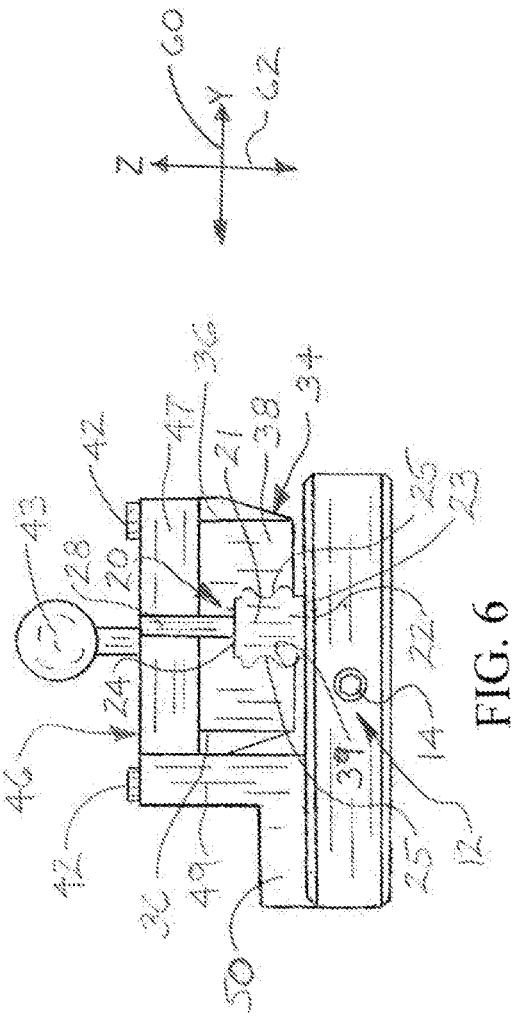
FIG. 5
FIG. 6

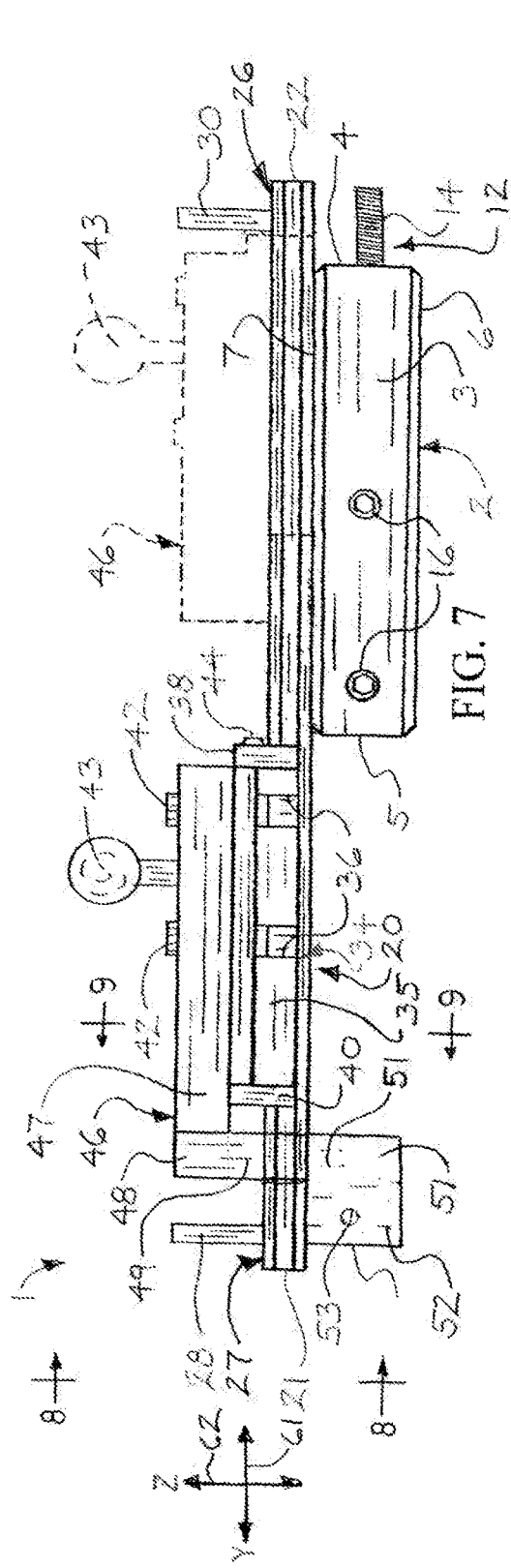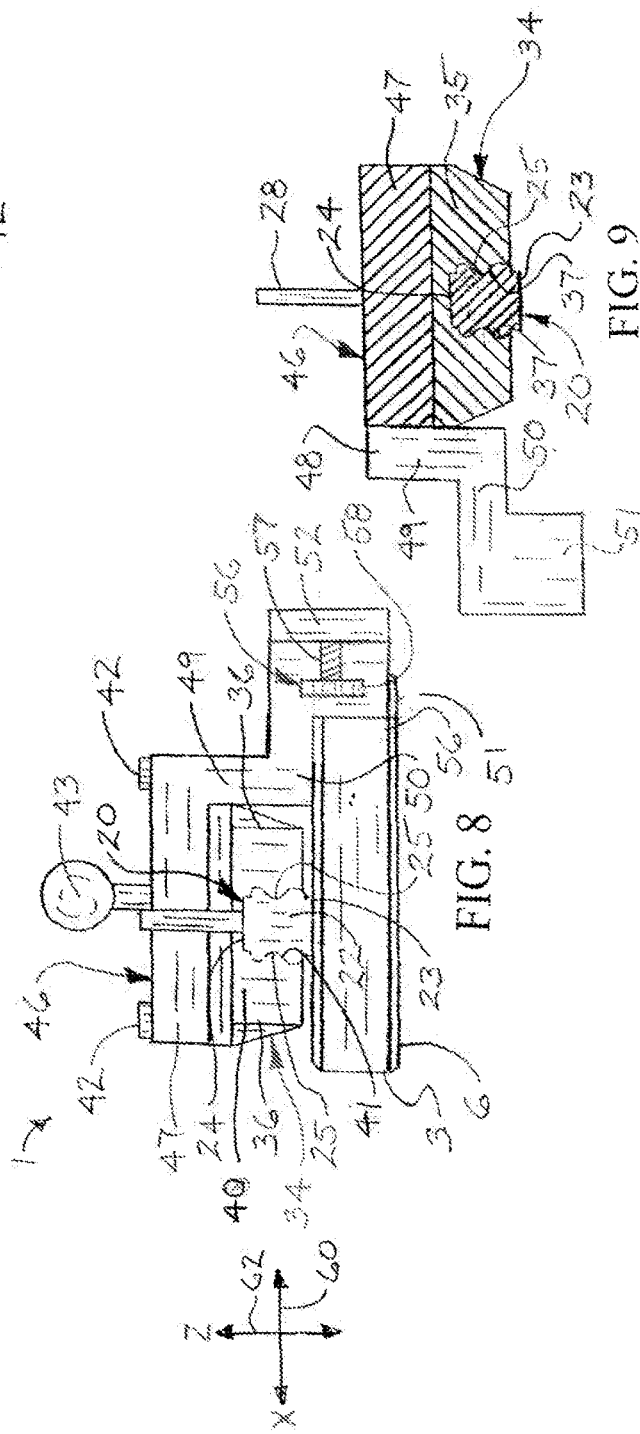

BLADE STOP DEVICES AND METHODS

FIELD

Illustrative embodiments of the disclosure relate to the grinding of cutting teeth on sawing or cutting workpieces for sharpening, maintaining or annealing purposes. More particularly, illustrative embodiments of the disclosure relate to blade stop devices and methods for stopping a sawblade at a predetermined stopping point relative to a grinding disk on a grinding tool of a sawblade grinding machine to facilitate consistent removal of a desired quantity or thickness of material from blade teeth on different sawblades.

BACKGROUND

The background description provided herein is solely for the purpose of generally presenting the context of the illustrative embodiments of the disclosure. Aspects of the background description are neither expressly nor impliedly admitted as prior art against the claimed subject matter.

A sawmill or lumber mill is a facility in which logs are cut to form lumber. In a typical conventional sawmill, one or more circular sawblades may be driven by a blade drive shaft and may each include multiple cutting teeth. The sawblade may be rotated against the end of a log such that the cutting teeth longitudinally cut the log into multiple lumber pieces. The cutting teeth on the sawblade each typically has a convex tooth back, a typically straight tooth face which extends from the tooth back in the radial direction toward the center of the sawblade, and a concave tooth gullet which extends from the tooth face of each cutting tooth to the tooth back of the forwardly-adjacent cutting tooth. A tooth tip may extend along the tooth face. The tooth tip may protrude beyond the tooth back and both of the side surfaces of the sawblade.

Before initial use of the sawblade, as well as after periods of use, the tooth tip of each cutting tooth may require grinding to achieve a precise outer diameter (O.D.) of the saw blade. This may be particularly important in cutting applications in which multiple sawblades are placed adjacent to each other on the blade drive shaft with the cutting teeth on the sawblades typically disposed in staggered relationship to each other. In such applications, it may be necessary to achieve the same O.D. for all of the sawblades on the blade drive shaft to attain optimum cutting results and sawblade life and efficiency.

The tooth tips of the cutting teeth on a circular sawblade may be grinded using a standard or conventional blade grinding machine. The blade grinding machine may have a machine interior which is selectively closeable by deployment of a machine door. A grinding tool having a grinding disk, along with a sawblade carriage and a sawblade clamp, may be provided in the machine interior. The sawblade carriage may be configured to support the sawblade in the machine interior and selectively transport the sawblade along a horizontal X-axis travel path toward and away from the grinding disk of the grinding tool. The grinding disk may be selectively movable along the X-axis travel path toward the sawblade carriage. The sawblade clamp may be situated to the side of the X-axis travel path from the sawblade carriage to the grinding disk. The sawblade clamp may be configured and movable along a horizontal Y-axis and operable to engage one or both side surfaces of the sawblade to stabilize the sawblade on the sawblade carriage.

In a typical grinding operation, the stopping point of the tooth tip on each cutting tooth relative to the grinding disk on the grinding tool may determine the quantity or thickness of material which is removed from the tooth tip. Often, thicknesses of hundreds or thousandths of an inch may be removed from the tooth tip of each cutting tooth. Thus, consistently and uniformly locating the tooth tip of each cutting tooth on the sawblade at the same distance from the grinding disk in order to achieve a precise O.D. of the sawblade or to achieve removal of a uniform thickness of material from cutting teeth of different sawblades may be critical. The machine operator typically must discern through experience the proper stopping point for the sawblade carriage in order to place the tooth tip at the correct distance with respect to the grinding disk of the grinding tool. Elucidating the correct stopping point for the sawblade carriage, however, is a laborious and time-consuming exercise and typically must be repeated for each sawblade. Moreover, because it is verified visually, the distance between the sawblade carriage and the grinding disk is vulnerable to variations from sawblade to sawblade as well as between operators of the blade grinding machine.

Therefore, blade stop devices and methods for stopping a sawblade at a predetermined stopping point relative to a grinding disk on a grinding tool of a sawblade grinding machine to facilitate consistent removal of a desired quantity or thickness of material from blade teeth on different sawblades are needed.

SUMMARY

Illustrative embodiments of the disclosure are generally directed to blade stop devices for stopping a sawblade at a predetermined stopping point relative to a grinding disk on a grinding tool of a sawblade grinding machine. An illustrative embodiment of the blade stop devices includes a device mount frame configured for mounting with respect to the grinding disk on the grinding tool of the sawblade grinding machine. A carriage rail may be provided on the device mount frame. A blade stop carriage may be adjustable along the carriage rail between a home position and a blade stop position. A blade stop arm may include an arm base carried by the blade stop carriage and a blade stop flange carried by the arm base.

Illustrative embodiments of the disclosure are further generally directed to methods of stopping a sawblade at a predetermined stopping point relative to a grinding disk on a grinding tool of a sawblade grinding machine to facilitate consistent removal of a desired quantity or thickness of material from blade teeth on different sawblades. An illustrative embodiment of the methods includes providing a blade stop device having a device mount frame, a carriage rail carried by the device mount frame, a blade stop carriage carried by and adjustable along the carriage rail between a home position and a blade stop position and a blade stop arm having an arm base carried by the blade stop carriage and a blade stop flange carried by the arm base; deploying the blade stop device in the machine interior of the sawblade grinding machine; deploying a sawblade in place on a sawblade carriage in the machine interior; displacing the blade stop carriage from a home position to a blade stop position on the carriage rail of the blade stop device; displacing the sawblade carriage with the sawblade toward the grinding disk on the grinding tool until the sawblade engages the blade stop flange on the blade stop arm of the blade stop device; and returning the blade stop carriage to the home position on the carriage rail.

BRIEF DESCRIPTION OF THE DRAWINGS

Illustrative embodiments of the disclosure will now be described, by way of example, with reference to the accompanying drawings, in which;

FIG. 2 is a top view of an illustrative blade stop device with a blade stop arm in a home position on a carriage rail of the device;

FIG. 3 is a top view of an illustrative blade stop device with the blade stop arm approaching a blade stop position on the carriage rail;

FIG. 5 is a right side view of an illustrative blade stop device with the blade stop arm in the blade stop position;

FIG. 6 is a rear end view of an illustrative blade stop device, taken along viewing lines 6-6 in FIG. 5;

FIG. 7 is left side view of an illustrative blade stop device with the blade stop arm in the blade stop position (in solid lines) and in the home position (in phantom lines);

FIG. 8 is a front view of an illustrative blade stop device, taken along viewing lines 8-8 in FIG. 7;

FIG. 9 is a cross-sectional view, taken along section lines 9-9 in FIG. 7, of the blade stop carriage, blade stop arm and carriage rail;

DETAILED DESCRIPTION

Figure 1:
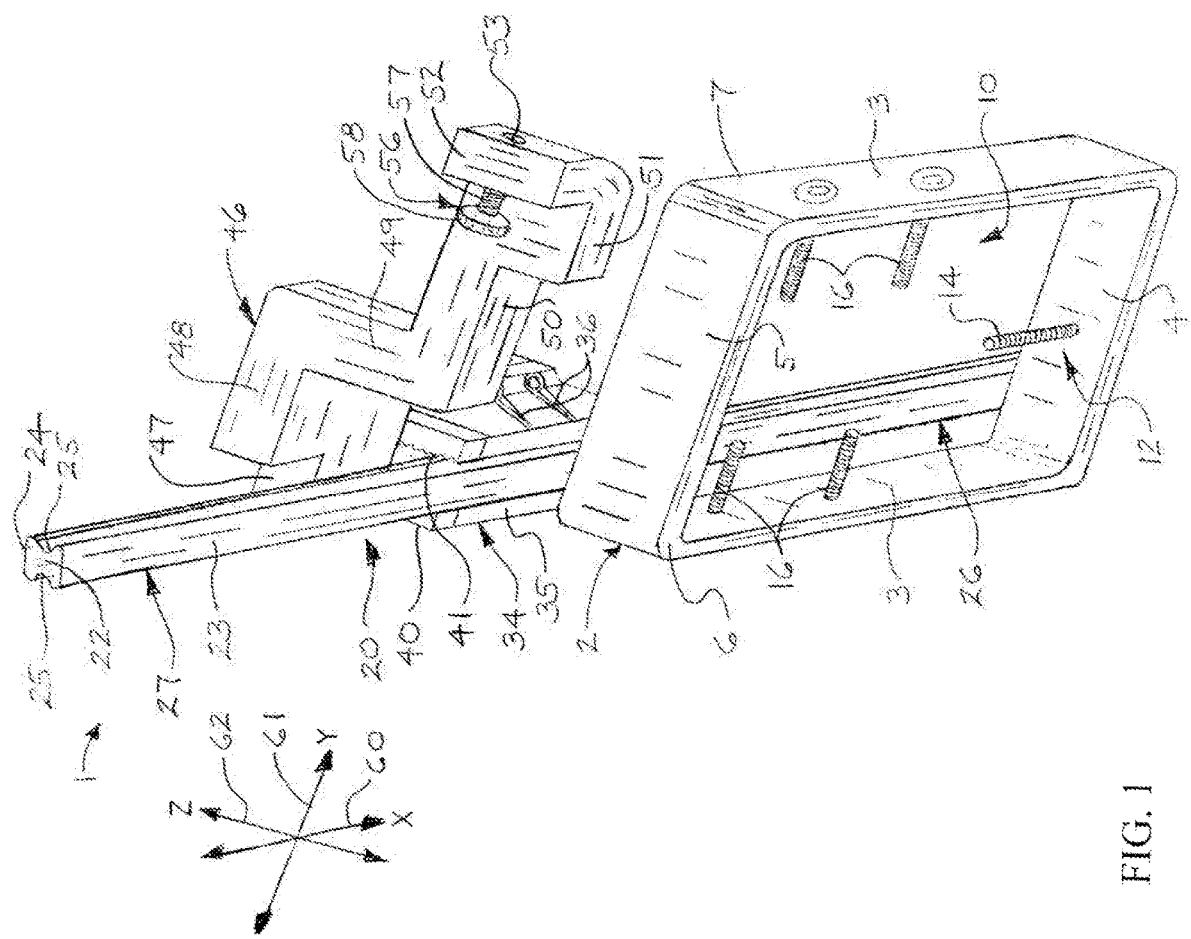
FIG. 1 is a front bottom perspective view of an illustrative embodiment of the blade stop devices.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 10:
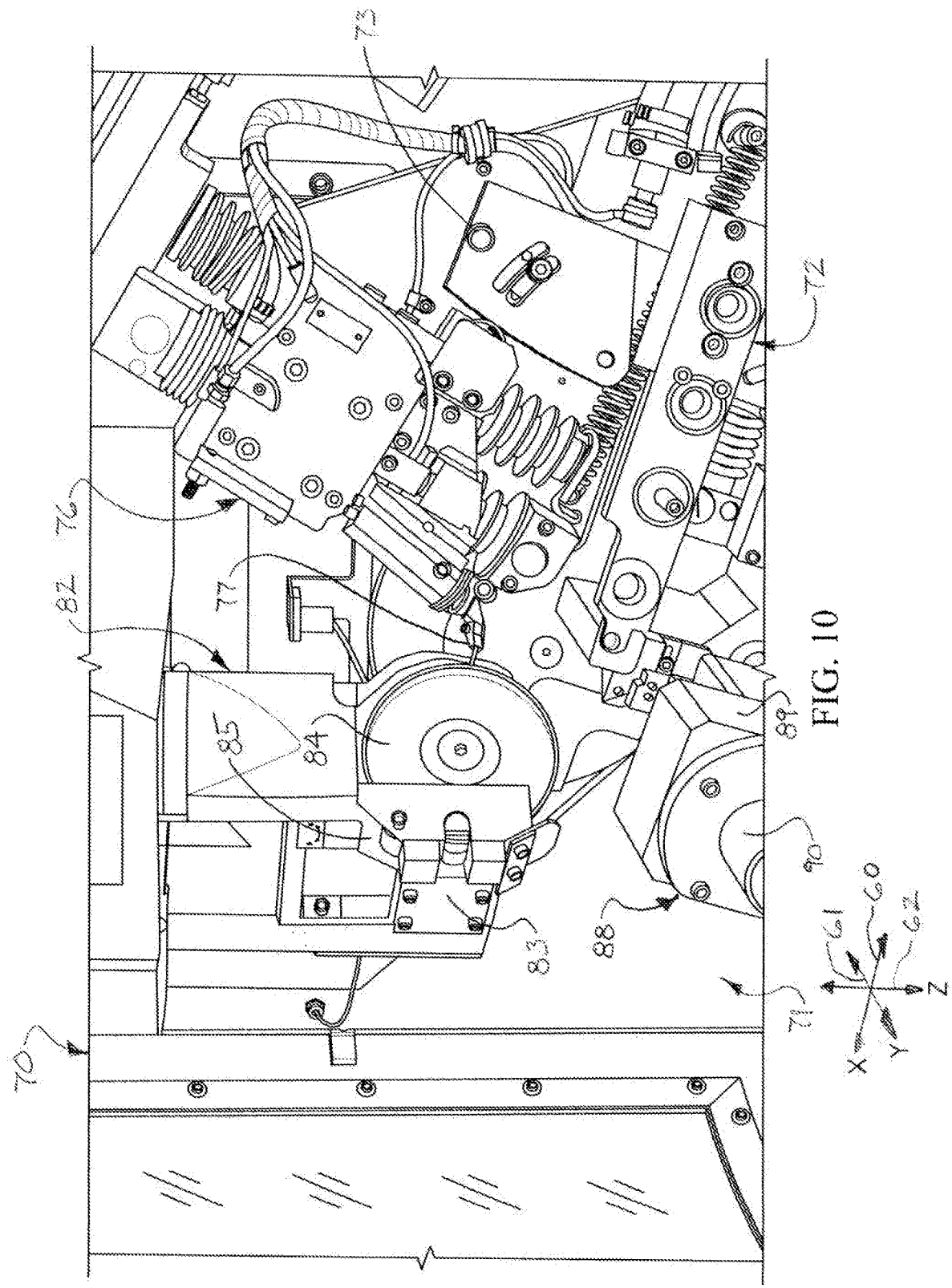
FIG. 10 is a perspective view of a machine interior of a blade grinding machine which is suitable for implementation of the blade stop device, with the blade stop device (not illustrated) removed from the machine interior.
Figure 11:
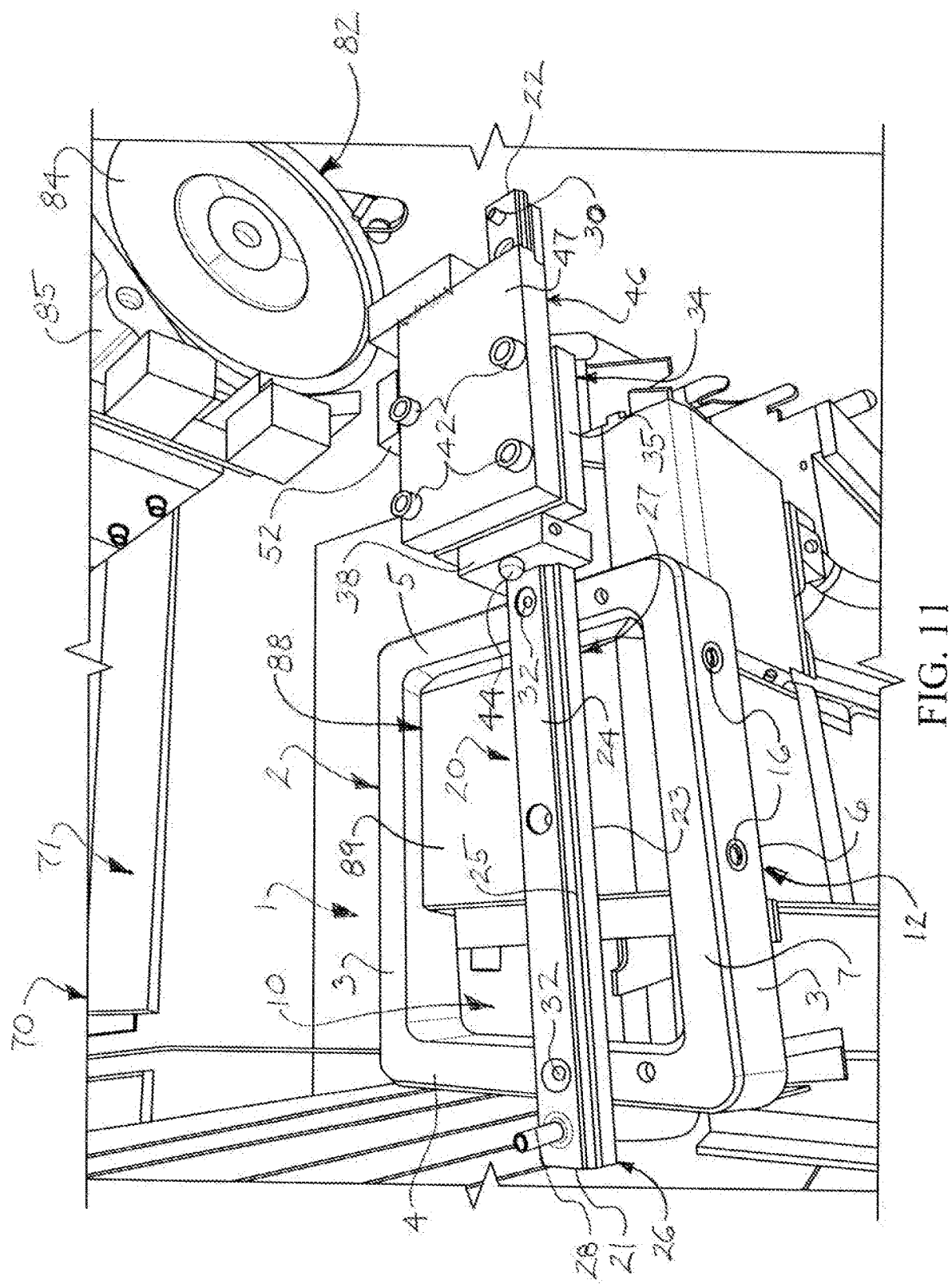
FIG. 11 is a perspective view of an illustrative blade stop device, deployed in place on a sawblade clamp in the machine interior of the blade grinding machine and the blade stop carriage and blade stop arm in the blade stop position on the carriage rail in typical application of the blade stop device.
Figure 12:
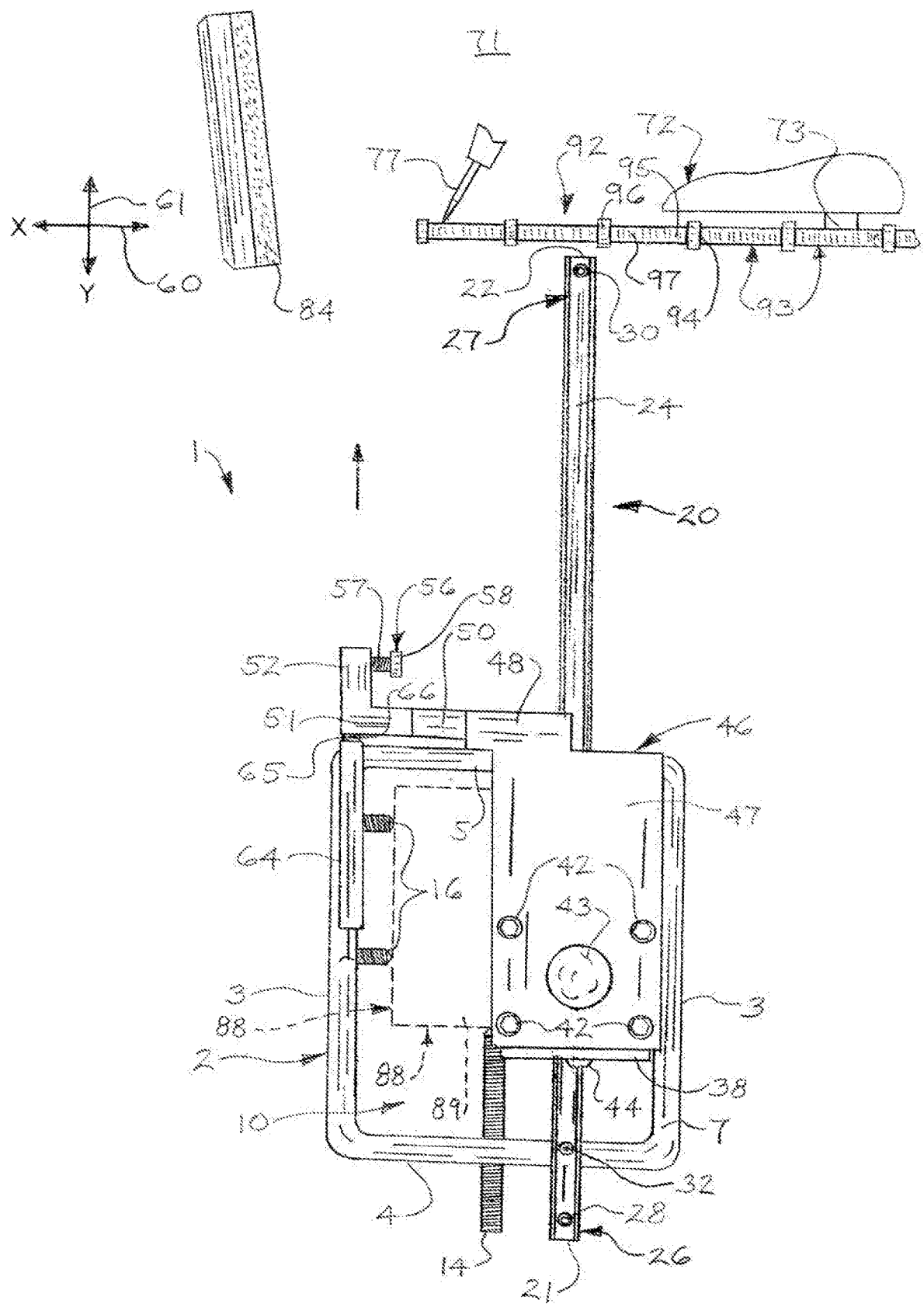
FIG. 12 is a top view of an illustrative blade stop device deployed in place on the blade clamp (illustrated in phantom) in the machine interior of the blade grinding machine, with a circular sawblade (partially in section) deployed on the sawblade carriage and the blade stop carriage and blade stop arm of the blade stop device in the home position on the carriage rail.
Figure 14:
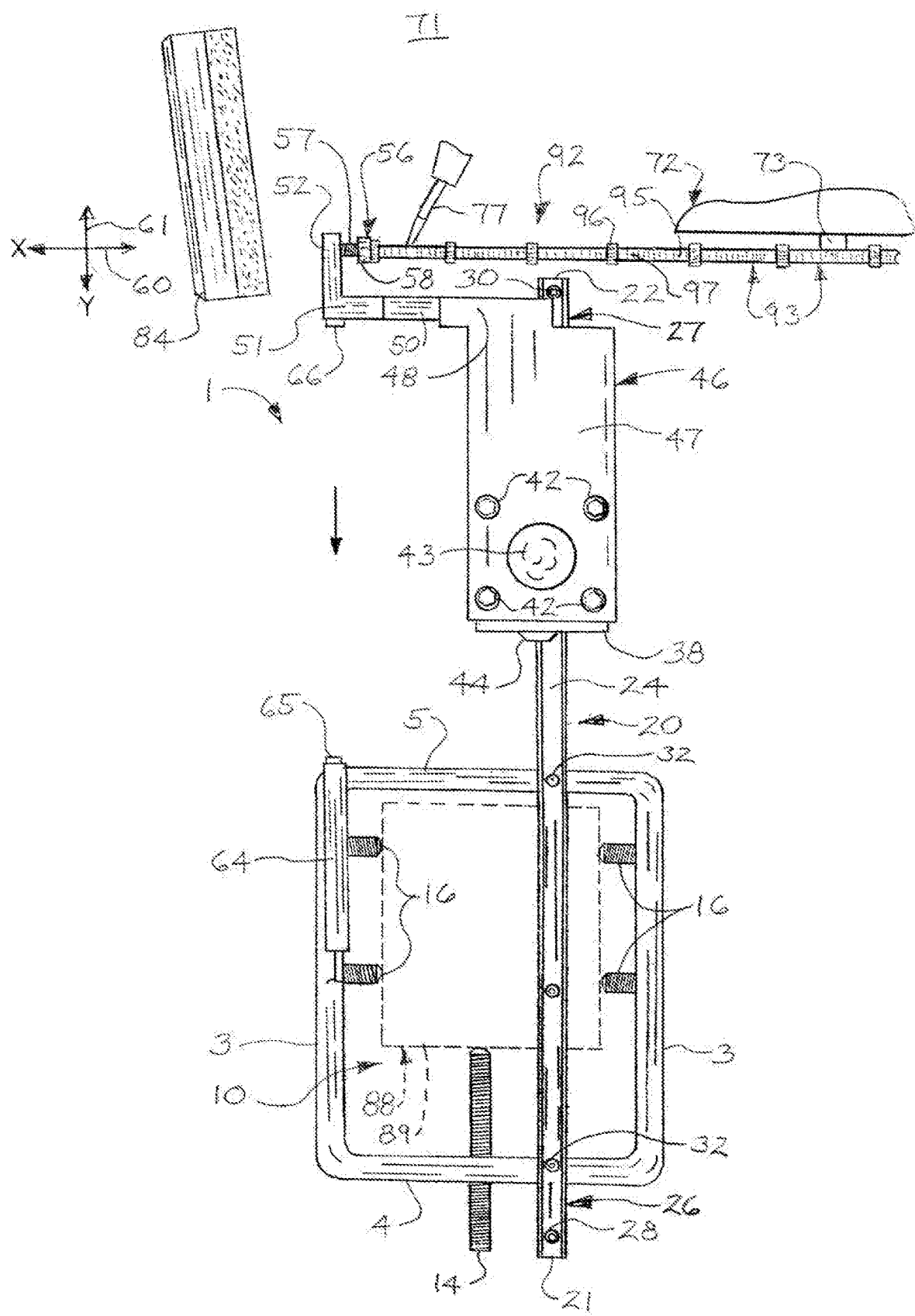
FIG. 14 is a top view of the illustrative blade stop device with the blade stop carriage and blade stop arm in the blade stop position on the carriage rail of the blade stop device and the circular sawblade moved into engagement with the blade stop arm.
Figure 15:
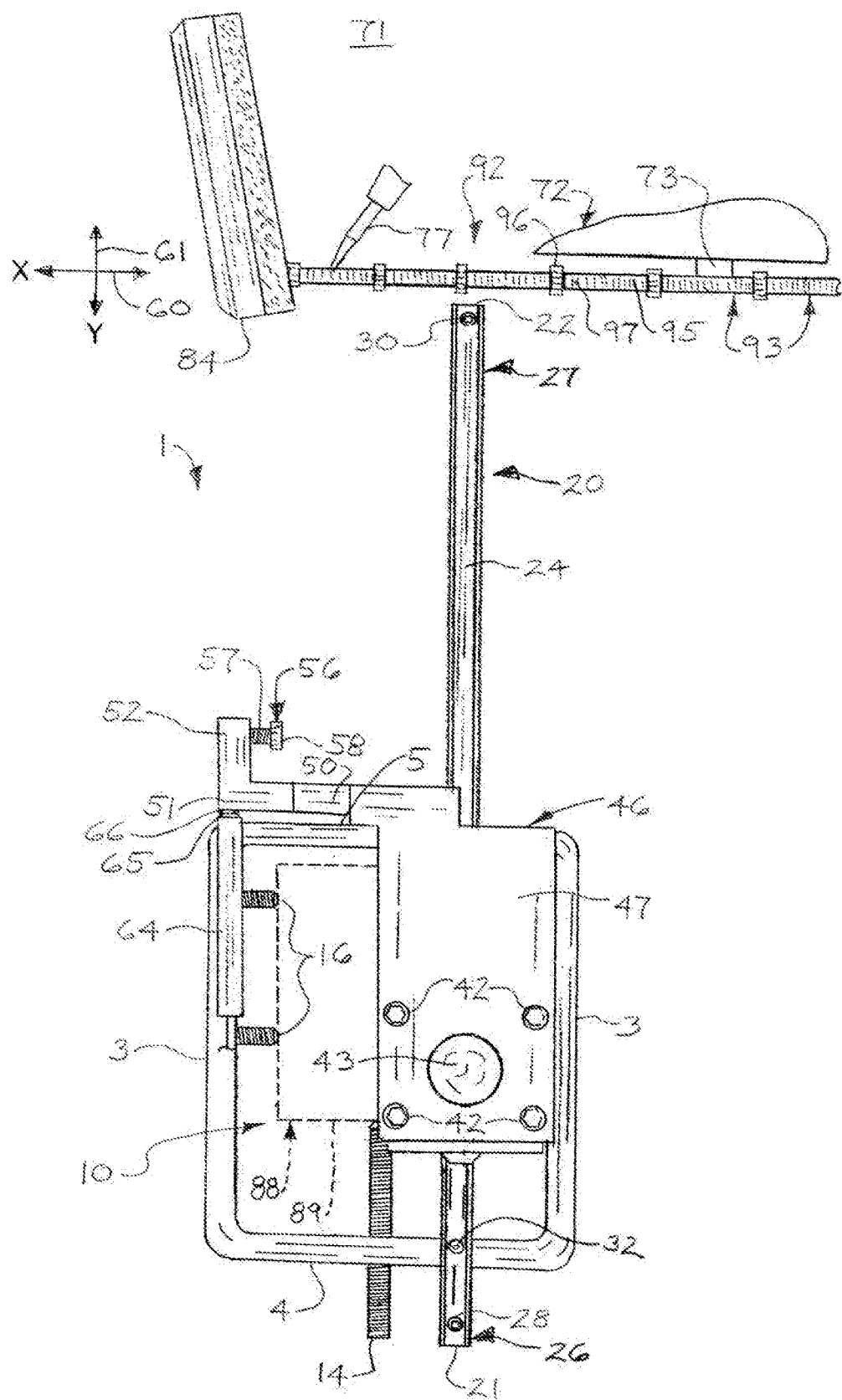
FIG. 15 is a top view of the illustrative blade stop device with the blade stop arm returned to the home position on the carriage rail and the grinding disk of the grinding tool grinding a tooth tip on a cutting tooth on the sawblade.
Figure 17:
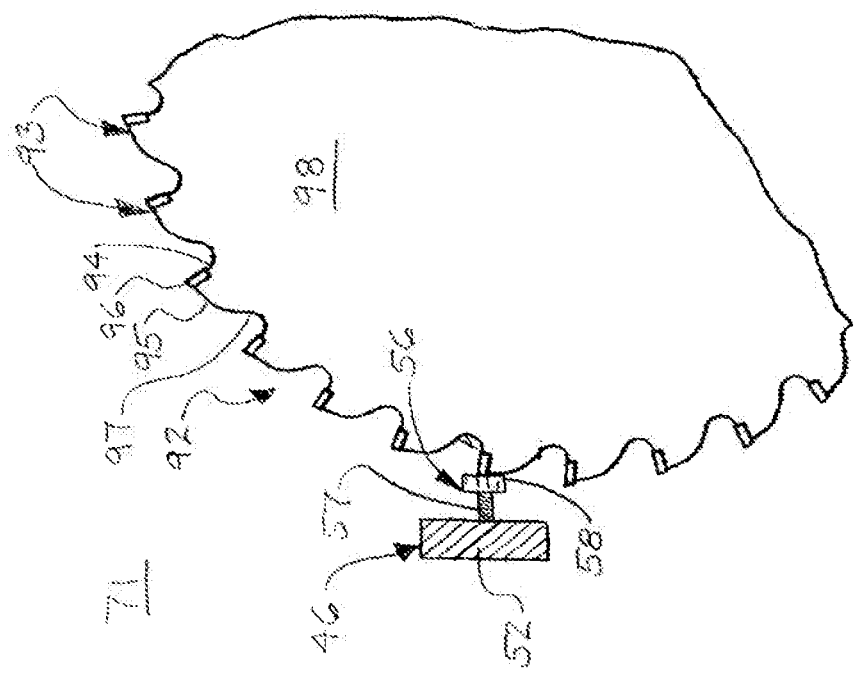
FIG. 17 is a side view of the circular sawblade and cross-sectional view of the blade stop arm of the blade stop device after movement of the circular sawblade into engagement with the blade contact screw on the blade stop arm.
Figure 16:
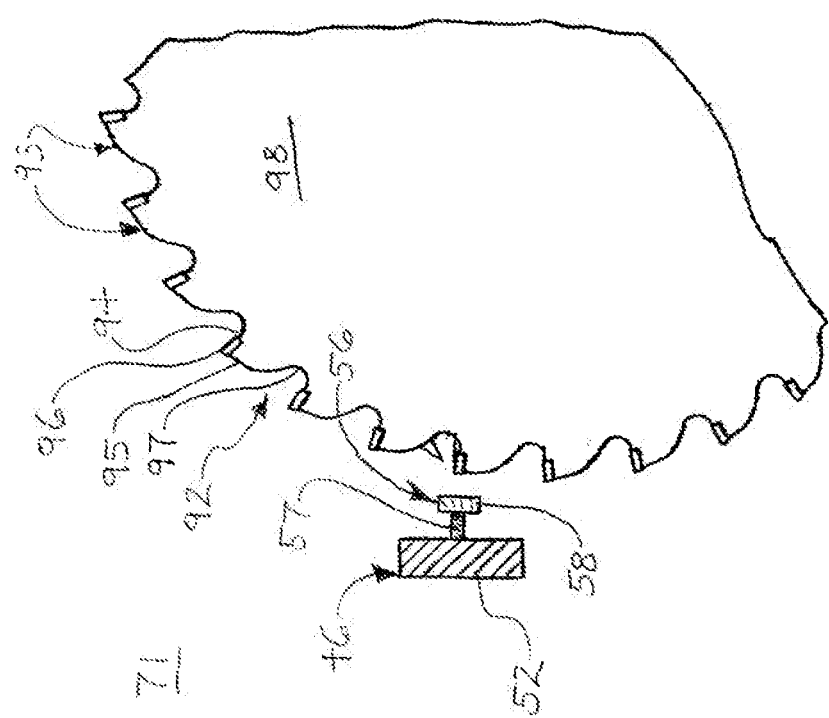
FIG. 16 is a side view of the circular sawblade and a cross-sectional view of the blade stop arm of the blade stop device prior to movement of the circular sawblade into engagement with a blade contact screw on the blade stop arm.

Referring initially to FIGS. 10-17 of the drawings, an illustrative embodiment of the blade stop devices of the disclosure is generally indicated by reference numeral 1 in FIGS. 11-15. The blade stop device 1 may be fabricated of metal such as steel and/or aluminum, plastics, composite materials and/or other suitable materials using casting, molding, machining and/or other fabrication techniques known by those skilled in the art. As illustrated in FIG. 11 and will be hereinafter described, the blade stop device 1 may be suitably configured for mounting in the machine interior 71 of a blade grinding machine 70. The blade grinding machine 70 may be a standard or conventional type of machine which is designed to grind and sharpen, maintain or anneal cutting teeth 93 (FIGS. 16 and 17) on a circular sawblade 92. As illustrated in FIGS. 16 and 17, the cutting teeth 93 may be arranged around the circumference of the sawblade 92. The cutting teeth 93 on the sawblade 92 each typically has a convex tooth back 95. A typically straight tooth face 94 may extend from a front end of the tooth back 95 in the radial direction toward the center of the sawblade 92. A concave tooth gullet 97 may extend from the tooth face 94 to the tooth back 95 of the forwardly-adjacent cutting tooth 93. A tooth tip 96 may extend along at least a portion of the tooth face 94. The tooth tip 96 may protrude beyond the tooth back 95 of the sawblade 92. The blade grinding machine 70 may facilitate grinding or removal of a selected quantity or thickness of material from the tooth tip 96 of each of the cutting teeth 93 to achieve a selected outer diameter (O.D.) of the circular sawblade 92, as will be hereinafter described.

A non-limiting example of a blade grinding machine 70 which is suitable for implementation of the blade stop device 1 is the VOLLMER™ 650 blade grinding machine. As illustrated in FIG. 10, the blade grinding machine 70 may include a saw blade carriage 72 in the machine interior 71. The saw blade carriage 72 may have a blade support 73 which is suitably configured to support the circular sawblade 92 in the machine interior 71, as illustrated in FIGS. 12-15. The saw blade carriage 72 may be configured for bidirectional travel along an X-axis 60, as further illustrated in FIGS. 12-15.

As further illustrated in FIG. 10, a grinding tool 82 in the machine interior 71 may include a grinding tool saddle 83. A grinding disk 84, driven by a grinding disk motor 85, may be provided on the grinding tool saddle 83. A saddle motor (not illustrated) may operably engage the grinding tool saddle 83 for bidirectional travel of the grinding tool saddle 83 along the X-axis 60, toward and away from the saw blade carriage 72.

A blade clamp 88 (FIG. 10) may be provided in the machine interior 71. The blade clamp 88 may be situated to the side of the travel path along the X-axis 60 between the saw blade carriage 72 and the grinding disk 84 on the grinding tool 82. The blade clamp 88 may include a clamp frame 89 having a clamp handle 90. A clamp arm (not illustrated) may extend from the clamp frame 89. The clamp frame 89 may be configured to travel along a horizontal Y-axis 61 to advance the clamp arm toward the sawblade 92 on the blade support 73 of the sawblade carriage 72. Accordingly, the clamp arm of the blade clamp 88 may be configured to engage at least one of the side blade surfaces 98 of the sawblade 92 to stabilize the sawblade 92 on the blade support 73 throughout the grinding operation.

A blade advancing module 76 may be provided in the machine interior 71. The blade advancing module 76 may have a blade advancing finger 77 which typically engages, pushes and releases the respective cutting teeth 93 to rotationally and sequentially advance the circular sawblade 92 on the blade support 73 of the blade advancing module 76 in increments which correspond to the distance between the tooth tips 96 on the respective cutting teeth 93. Accordingly, the blade advancing finger 77 may sequentially align the cutting teeth 93 on the circular sawblade 92 with the grinding disk 84 of the grinding tool 82 to facilitate sequential grinding of the tooth tips 96 on the respective cutting teeth 93. The blade advancing module 76 may be configured for bidirectional movement along a vertical Z-axis 62 in the machine interior 71.

In typical application, which will be hereinafter described, the blade stop device 1 may be secured on the clamp frame 89 of the sawblade clamp 88 in the machine interior 71 of the blade grinding machine 70. A machine operator (not illustrated) may stand outside the machine interior 71 in front of the blade grinding machine 70 and manipulate a control panel (not illustrated) to input the various parameters for the blade grinding operation. As used herein, the term "proximal" as applied to the components of the blade stop device 1 is intended to mean "closer in proximity to the machine operator" and the term "distal" is intended to mean "farther in proximity from the machine operator" as the machine operator stands in the operator's position outside the blade grinding machine 70. It will be recognized and understood, however, that applications of the blade stop device 1 may be possible in which the orientations of those components to which the terms "proximal" and "distal" are applied herein are not applicable. Therefore, the terms "proximal" and "distal" as used herein are to be construed in a non-limiting descriptive sense and not in a limiting sense.

Referring next to FIGS. 1-9 and 12-15 of the drawings, the blade stop device 1 may include a device mount frame 2. In some embodiments, the device mount frame 2 may be generally elongated and rectangular in shape. Accordingly, the device mount frame 2 may include a pair of generally elongated, parallel, spaced-apart side frame members 3. A generally elongated proximal frame member 4 and a generally elongated distal frame member 5 may extend between the side frame members 3 in generally parallel, spaced-apart relationship to each other. The device mount frame 3 may have a lower frame surface 6 and an upper frame surface 7. A frame opening 10 may be defined by and between the side frame members 3, the proximal frame member 4 and the distal frame member 5. As illustrated in FIGS. 12-15, the frame opening 10 of the device mount frame 2 may be suitably sized and configured to accommodate the clamp frame 89 (illustrated in phantom) on the sawblade clamp 88 to deploy the blade stop device 1 in the machine interior 71 of the blade grinding machine 70 for operational use, as will be hereinafter described.

As illustrated in FIGS. 1-4, in some embodiments, a frame securing mechanism 12 may be provided on the device mount frame 2. The frame securing mechanism 12 may facilitate securement of the device mount frame 2 on the clamp frame 89 (FIGS. 12-15) of the sawblade clamp 88. In some embodiments, the frame securing mechanism 12 may include at least one proximal frame mount bolt 14 which may be threaded through at least one proximal frame mount bolt opening (not illustrated) in the proximal frame member 4 of the device mount frame 2. The frame securing mechanism 12 may additionally or alternatively include at least one side frame mount bolt 16 which may be threaded through at least one side frame mount bolt opening (not illustrated) in each side frame member 3 of the device mount frame 2. Accordingly, the proximal frame mount bolt 14 and the side frame mount bolts 16 may protrude into the frame opening 10 of the device mount frame 2 and threaded into engagement with the clamp frame 89 to secure the device mount frame 2 on the clamp frame 89. It will be recognized and understood by those skilled in the art that the device mount frame 2 may have alternative designs and shapes which facilitate securement of the device frame 2 on the clamp frame 89 or other structure or component inside the machine interior 71 of the blade grinding machine 70 and are consistent with the functional requirements of the blade stop device 1. Moreover, the frame securing mechanism 12 may utilize securing devices or techniques other than or in addition to the proximal frame mount bolt 14 and the side frame mount bolts 16 which are suitable for the purpose of securing the device mount frame 2 on the clamp frame 89 or other structure or component in the machine interior 71. Non-limiting examples of these securing devices or techniques may include but are not limited to magnets, clamps and mechanical fasteners.

Figure 4:
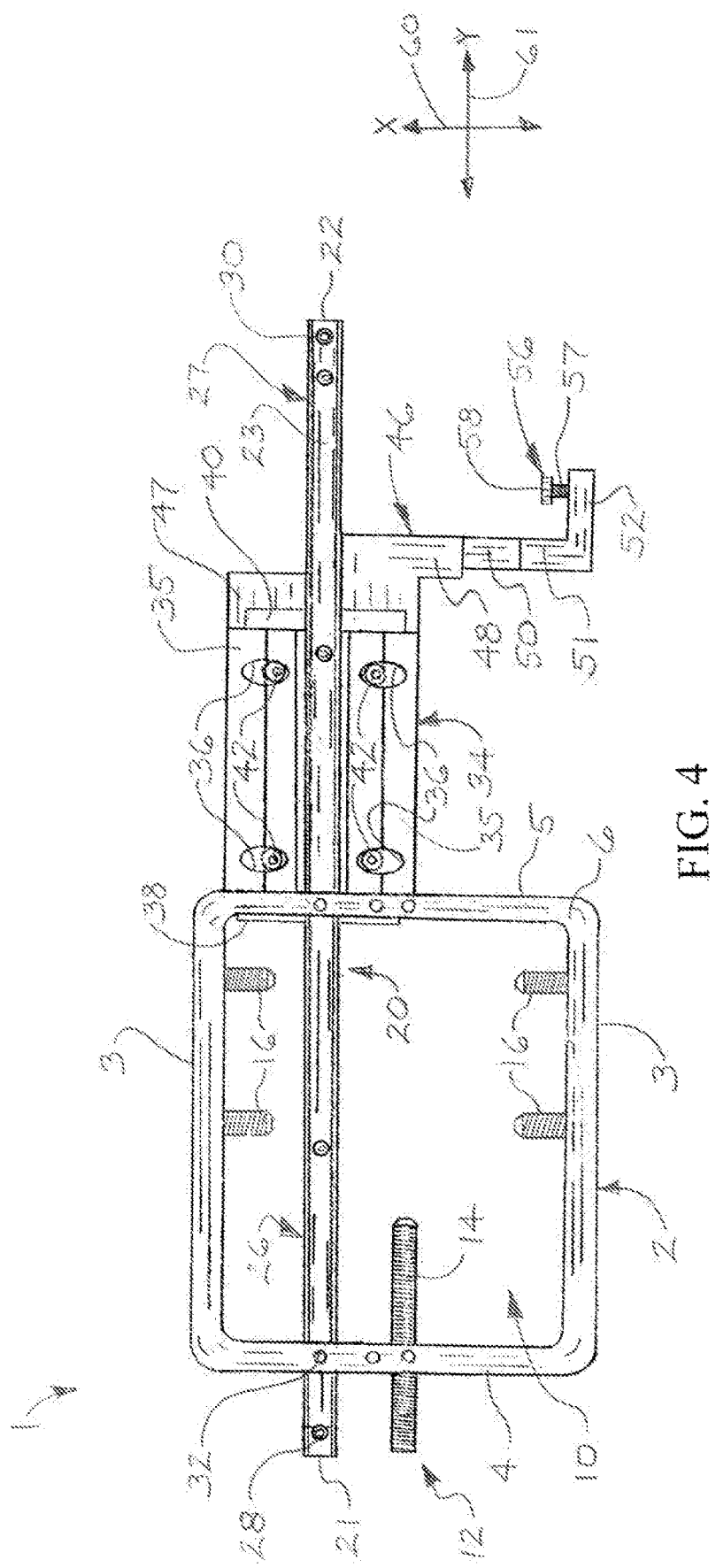
FIG. 4 is a bottom view of an illustrative blade stop device with the blade stop arm approaching the blade stop position on the carriage rail.

An elongated carriage rail 20 may extend from the device mount frame 2. In some embodiments, the carriage rail 20 may be provided on the upper frame surface 7 of the device mount frame 2. As illustrated in FIGS. 2-4, the carriage rail 20 may have a frame mount rail segment 26 which may be generally coextensive with the device mount frame 2 and an extending rail segment 27 which extends from the frame mount rail segment 26 beyond the device mount frame 2. The frame mount rail segment 26 of the carriage rail 20 may have a proximal rail end 21, and the extending rail segment 27 may have a distal rail end 22. As further illustrated in FIGS. 2-4, the proximal rail end 21 of the frame mount rail segment 26 may terminate at or protrude beyond the proximal frame member 4 of the device mount frame 2. The distal rail end 22 of the extending rail segment 27 may protrude beyond the distal frame member 5 of the device mount frame 2.

As illustrated in FIGS. 1, 6, 8 and 9, the carriage rail 20 may have a lower rail surface 23 and an upper rail surface 24. Each of the lower rail surface 23 and the upper rail surface 24 may be generally flat or planar. A pair of concave side rail grooves 25 may extend into opposite sides and along at least a portion of the length of the carriage rail 20 for purposes which will be hereinafter described. The lower rail surface 23 on the frame mount rail segment 26 of the carriage rail 20 may be attached to the upper frame surface 7 of the device mount frame 2 via welding, mechanical fasteners and/or alternative techniques known by those skilled in the art. For example and without limitation, as illustrated in FIGS. 2 and 3, in some embodiments, rail fasteners 32 may be extended through a respective pair of rail fastener openings (not illustrated) in the carriage rail 20 and threaded into corresponding fastener openings (not illustrated) in the respective underlying proximal frame member 4 and distal frame member 5 of the device mount frame 2. Alternatively, the lower rail surface 23 of the carriage rail 20 may be cast, molded and/or otherwise fabricated in one piece with the device mount frame 2 according to the knowledge of those skilled in the art.

A blade stop carriage 34 may be mounted for adjustable bidirectional travel on the carriage rail 20 according to the knowledge of those skilled in the art. In some embodiments, the blade stop carriage 34 may include a carriage base 35 which may be generally elongated. The carriage base 35 may be configured to slidably interface with the side rail grooves 25 in the carriage rail 20. As illustrated in FIG. 9, a carriage rail slot 37 may extend within and along the length of the carriage base 35. The carriage rail slot 37 may be suitably sized, shaped and configured to accommodate the carriage rail 20 to slidably mount the carriage base 35 on the carriage rail 20. As illustrated in FIGS. 5 and 7, a proximal carriage plate 38 and a distal carriage plate 40 may be provided on proximal and distal ends, respectively, of the carriage base 35. As illustrated in FIG. 6, the proximal carriage plate 38 may have a proximal plate rail slot 39 which is suitably sized, shaped and configured to accommodate the carriage rail 20. As illustrated in FIG. 8, in like manner, the distal carriage plate 40 may have a distal plate rail slot 41 which is suitably sized, shaped and configured to accommodate the carriage rail 20. Accordingly, the carriage base 35 of the blade stop carriage 34 may be selectively positional along the carriage rail 20 between the proximal home position illustrated in FIG. 2 and the distal blade stop position illustrated in FIG. 5. A proximal carriage stop 28 and a distal carriage stop 30 may extend upwardly from the upper rail surface 24 at the proximal rail end 21 and the distal rail end 22, respectively, of the carriage rail 20, to prevent the blade stop carriage 34 from inadvertently sliding from the carriage rail 20. In some embodiments, a grease fitting 44 may be provided on the proximal carriage plate 38, as illustrated, or alternatively, on the distal carriage plate 40 to facilitate application of grease to the carriage rail 20 through the proximal plate rail slot 39 and/or the distal plate rail slot 41 as is known by those skilled in the art.

A blade stop arm 46 may be provided on the carriage base 35 of the blade stop carriage 34. In some embodiments, the blade stop arm 46 may include an arm base 47 which may be provided on the carriage base 35 of the blade stop carriage 34. The arm base 47 of the blade stop arm 46 may be mounted on the carriage base 35 of the blade stop carriage 34 using any suitable technique known by those skilled in the art. In some embodiments, arm fasteners 42 may be extended through respective fastener openings (not illustrated) in the arm base 47 and threaded into respective bolt seats 36 in the underlying carriage base 35. In alternative embodiments, the arm base 47 may be fabricated in one piece with the carriage base 35 according to the knowledge of those skilled in the art. As illustrated in FIGS. 2, 3 and 5-8, in some embodiments, a carriage handle 43 may be provided on the arm base 47 of the blade stop arm 46 to facilitate manual movement of the blade stop carriage 34 and blade stop arm 46 along the carriage rail 20.

A proximal arm segment 48 may extend distally and outwardly from a distal end of the arm base 47 along the Y-axis 60. A middle arm segment 49 may extend perpendicularly downwardly from an extending end of the proximal arm segment 48 along a Z-axis 62. A distal arm segment 50 may extend perpendicularly outwardly from an extending end of the middle arm segment 49 along the Y-axis 60. A terminal arm segment 51 may extend perpendicularly downwardly from an extending end of the distal arm segment 50 along the Z-axis 62. A blade stop flange 52 may extend perpendicularly distally from the terminal arm segment 51 along the Y-axis 61. Accordingly, in typical application of the blade stop device 1, which will be hereinafter described, the directional turns of the proximal arm segment 48, the middle arm segment 49, the distal arm segment 50, the terminal arm segment 51 and the blade stop flange 52 may facilitate clearance of the blade stop arm 46 with the various components and structures in the machine interior 71 of the blade grinding machine 70 for unhindered access and deployment of the blade stop arm 46 along the carriage rail 20. In alternative embodiments, the blade stop device 1 may be suitably configured for operation with blade grinding machines 70 having interior components and structures in various locations in the blade interior 71. Accordingly, the blade stop arm 46 may be straight or may have alternative segments, configurations and/or turns depending on the clearance or access requirements of the blade stop device 1 in the machine interior 71 of the blade grinding machine 70.

A blade contact element 56 may be provided on the blade stop flange 52 of the blade stop arm 46. In some embodiments, the blade contact element 56 may include a blade contact screw 56 having a screw shank 57. A screw head 58 may terminate the screw shank 57. As illustrated in FIG. 8, the screw head 58 may face the space which underlies the extending rail segment 27 of the carriage rail 20. An interiorly-threaded screw opening 53 may extend through the blade stop flange 52. The screw shank 57 of the blade contact screw 56 may be exteriorly-threaded to engage the screw opening 53. Accordingly, the distance between the blade stop flange 52 and the screw head 58 of the blade contact screw 56 may be selected by threading the screw shank 57 in the screw opening 53.

Referring next to FIGS. 10-17 of the drawings, in typical application of the blade stop device 1, the mounting frame 2 may be mounted on the clamp frame 89 of the sawblade clamp 88 in the machine interior 71 of the blade grinding machine 70. As illustrated in FIG. 11, in some applications, this may be accomplished by lowering the mounting frame 2 in place over the clamp frame 89 as the clamp frame 89 inserts through the frame opening 10 and the carriage rail 20 is typically lowered to rest on the sawblade clamp 88. The frame securing mechanism 12 may be engaged to secure the mounting frame 2 on the clamp frame 89. Accordingly, in some embodiments, the proximal frame mount bolt 14 and the side frame mount bolts 16 of the frame securing mechanism 12 may be tightened against the respective sides of the clamp frame 89 for the purpose.

Figure 13:
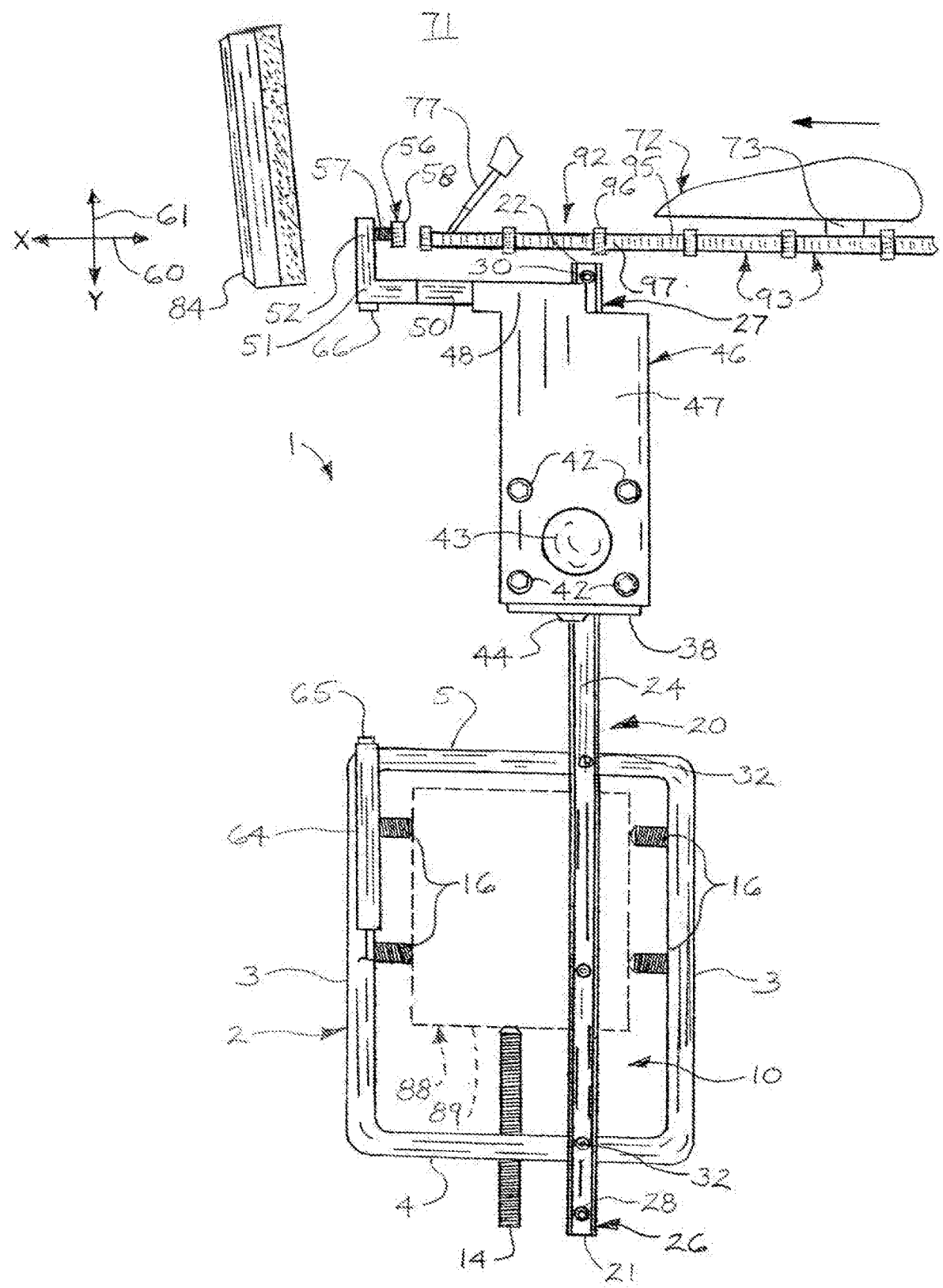
FIG. 13 is a top view of the illustrative blade stop device after movement of the sawblade carriage and circular sawblade along an X-axis travel path toward the grinding disk of the grinding tool, with the blade stop carriage and blade stop arm of the blade stop device in the blade stop position on the carriage rail.

As illustrated in FIGS. 12-16, the circular sawblade 92 may be deployed in place on the blade support 73 on the sawblade carriage 72 in the machine interior 71. The blade advancing module 76 (FIG. 10) may be operated to lower the blade advancing finger 77 from a raised stowage position (not illustrated) to the operational position illustrated in FIG. 10 in which the blade advancing finger 77 is disposed in the travel path along the X-axis 60 between the sawblade 92 and the grinding disk 84 of the grinding tool 82. The sawblade carriage 72, with the circular sawblade 92 mounted thereon, may then be displaced from a blade loading/unloading position, along the X-axis 60 toward the grinding disk 84 until the blade advancing finger 77 on the blade advancing module 76 typically initially inserts in the space between adjacent cutting teeth 93 on the sawblade 92, as illustrated in FIGS. 13 and 16. The blade stop carriage 34 may be slid along the carriage rail 20 from the proximal home position illustrated in FIG. 12 to the distal blade stop position illustrated in FIG. 13 to position the blade contact screw 56 on the blade stop flange 52 of the blade stop arm 46 in the travel path along the X-axis 60 between the sawblade 92 and the grinding disk 84 of the grinding tool 82. The sawblade carriage 72 may continue to be displaced toward the grinding disk 84 until the tooth tip 96 of one of the cutting teeth 93 on the circular sawblade 92 stops at the blade stop position by engaging the screw head 58 on the blade contact screw 56, as illustrated in FIGS. 14 and 17. The blade stop carriage 34 and blade stop arm 46 may then be returned to the proximal home position on the carriage rail 20, as illustrated in FIG. 15. The sawblade carriage 72 may be tightened in place to secure the sawblade 92 at the blade stop position, after which a machine door (not illustrated) on the blade grinding machine 70 may be closed.

The selected quantity or thickness of material which is to be removed from the outer surface of the tooth tip 96 on each cutting tooth 93 on the circular sawblade 92 may be entered into a control panel (not illustrated) on the blade grinding machine 70, typically in the conventional manner. The grinding tool 82 may then cause the grinding disk 84 to approach the sawblade 92 along the X-axis 60 until the grinding disk 84 contacts the tooth tip 96. Thus, the X-axis contact point of the grinding disk 84 with the tooth tip 96 may serve as an X-axis reference point for the grinding disk 84 in subsequent grinding operations for the cutting teeth 93 on other sawblades 92. The machine operator may note the X-axis reference point on the control panel for the blade grinding machine 70. The grinding disk 84 may rotate and remove the preselected quantity or thickness of the material from the tooth tip 96 which was programmed into the control panel of the blade grinding machine 70.

After the material is removed from the tooth tip 96, the grinding disk 84 may disengage the cutting tooth 93. The blade advancing finger 77 of the blade advancing module 76 may contact the cutting tooth 93 and rotationally advance the sawblade 92 to the next adjacent cutting tooth 93, after which the grinding disk 84 may contact the tooth tip 96 and remove the same quantity or thickness of material from the tooth tip 96 of that cutting tooth 93. The same procedure may be sequentially repeated for all of the cutting teeth 93 on the circular sawblade 92 to remove the same quantity or thickness of material from the outer surface of the tooth tip 96 on each cutting tooth 93. After grinding of the tooth tips 96 on all of the respective cutting teeth 96 is completed, the sawblade carriage 72 may be returned to the blade loading/unloading position in the machine interior 71 and the circular sawblade 92 removed from the blade support 73 on the sawblade carriage 72.

Subsequent sawblades 92, the same quantity or thickness of material of which is to be removed from the tooth tips 96 of the respective cutting teeth 93, may be successively placed on the blade support 73 of the sawblade carriage 72 and the tooth tips 96 grinded in like manner. Accordingly, preparatory to grinding the tooth tips 96 on each sawblade 92, the blade stop carriage 34 and blade stop arm 46 of the blade stop device 1 may initially be deployed to provide the blade stop position for each subsequent circular sawblade 92 such that the grinding disk 84 may remove the same quantity or thickness of material from the tooth tips 96 of the respective cutting teeth 93 on the subsequent circular sawblades 92 as was removed from the tooth tips 96 on the cutting teeth 93 of the first circular sawblade 92. Thus, the blade stop device 1 may eliminate the need for the machine operator to estimate and adjust the blade stop position of the circular sawblade 92 relative to the grinding disk 84 for removal of the same quantity or thickness of material from the tooth tips 96 of the cutting teeth 93 on successive circular sawblades 92, thus achieving the same outer diameter (O.D.) on all of the circular sawblades 92. The blade stop device 1 may also eliminate the need for the machine operator to estimate and adjust the blade stop position of the circular sawblade 92 to achieve removal of the same quantity or thickness of material from the tooth tips 96 of cutting teeth 93 on successive circular sawblades 92 irrespective of any differences in O.D. which may exist between the circular sawblades 92. This expedient may reduce the time which is required to grind the tooth tips 96 of the cutting teeth 93 on multiple sequential circular sawblades 92, significantly reducing throughput time and increasing work output.

In some applications, it may be desirable to "top grind" the tooth tips 96 on the cutting teeth 93 of one or more of the circular sawblades 92. This may be accomplished by varying the spacing or distance between the screw head 58 on the blade contact screw 56 and the blade stop flange 52 on the blade stop arm 56 typically by threading or unthreading the screw shank 57 in the screw opening 53 (FIG. 1) in the blade stop flange 52.

In the event that a quantity or thickness of material which is to be removed from the tooth tips 96 of the cutting teeth 93 on another circular sawblade 92 differs from that of the previous sawblade or sawblades 92, the blade stop device 1 may again be deployed for that circular sawblade 92 to determine the blade stop position for the circular sawblade 92. The X-axis reference point of contact of the grinding disk 84 on the grinding tool 82 with the tooth tips 96 may differ from that which was used for the first set of circular sawblades 92 and may be used for subsequent circular sawblades 92 of which the same quantity or thickness of material is to be removed from the tooth tips 96.

Referring next to FIGS. 2, 3, 12-15 and 18 of the drawings, in some embodiments, a carriage switch 64 may be provided on the device mount frame 2 of the blade stop device 1. In some embodiments, the carriage switch 64 may be provided on one of the side frame members 3 of the device mount frame 2, as illustrated, or may be provided in any other suitable location or position. The carriage switch 64 may have a proximal switch contact 65 on the device mount frame 2 and a distal switch contact 66 on the blade stop arm 46. In some embodiments, the distal switch contact 66 may be provided on the terminal arm segment 51 of the blade stop arm 46. Accordingly, when the blade stop carriage 34 and blade stop arm 46 are deployed in the proximal home position illustrated in FIGS. 12 and 15, the distal switch contact 66 on the blade stop arm 46 may contact the proximal switch contact 65 on the device mount frame 2, closing the carriage switch 64. Conversely, when the blade stop carriage 34 and blade stop arm 46 are deployed in the distal blade-stop position illustrated in FIGS. 13 and 14, the distal switch contact 66 may disengage the proximal switch contact 65, opening the carriage switch 64.

Figure 18:
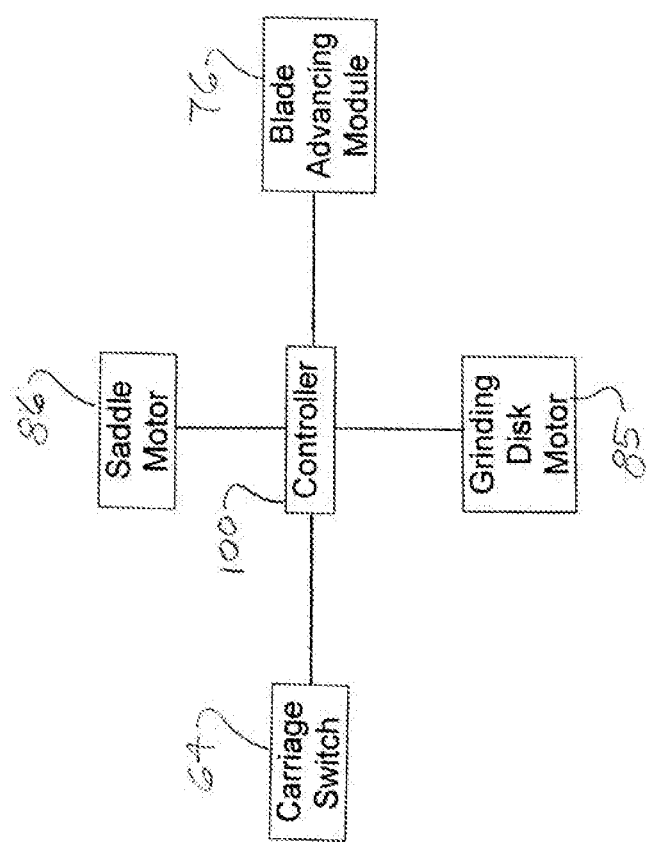
FIG. 18 is a block diagram illustrating typical operational interfacing of a carriage switch on the blade stop carriage of the blade stop device with a controller of the blade grinding machine.

As illustrated in FIG. 18, the blade grinding machine 70 may include a controller 100 which carries out the functions of the blade grinding machine 70. The controller 100 may controllably interface with the blade advancing module 76, the grinding disk motor 85, the saddle motor 86 and other functional components of the blade grinding machine 70. The carriage switch 64 may interface with the controller 100. The controller 100 may be programmed or configured to recognize the open and closed positions of the carriage switch 64. Accordingly, in the open position, the carriage switch 64 may prevent the controller 100 from initiating the grinding operation, whereas in the closed position, the carriage switch 64 may enable the controller 100 to initiate and implement the grinding operation. Thus, the grinding operation may only proceed as long as the blade stop carriage 34 and blade stop arm 46 of the blade stop device 1 are deployed in the home position on the carriage rail 20, illustrated in FIGS. 12 and 15.

Figure 19:
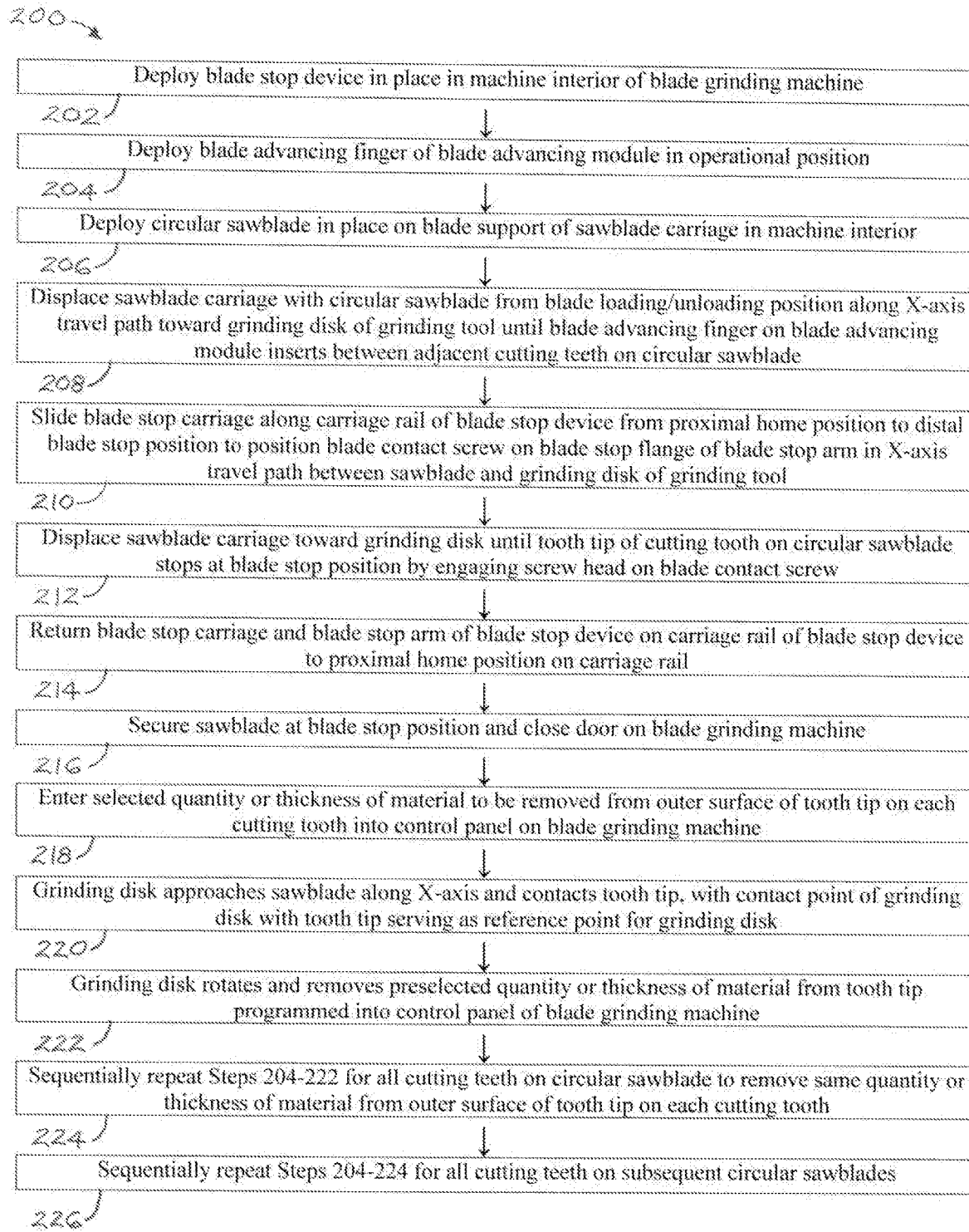
FIG. 19 is a flow diagram of an illustrative embodiment of the blade stop methods.

Referring next to FIG. 19 of the drawings, a flow diagram of an illustrative embodiment of the blade stop methods is generally indicated by reference numeral 200. At Step 202, a blade stop device may be deployed in place in the machine interior of a blade grinding machine. At Step 204, a blade advancing finger of a blade advancing module may be deployed in an operational position in the machine interior. At Step 206, a circular sawblade may be deployed in place on a blade support of a sawblade carriage in the machine interior.

At Step 208, the sawblade carriage with the circular sawblade thereon may be displaced from a blade loading/unloading position along an X-axis travel path toward a grinding disk of a grinding tool until a blade advancing finger on the blade advancing module inserts between adjacent cutting teeth on the circular sawblade. At Step 210, the blade stop carriage may be slid along a carriage rail of the blade stop device from a proximal home position to a distal blade stop position to position a blade contact screw on the blade stop flange of the blade stop arm in the X-axis travel path between the sawblade and the grinding disk of the grinding tool.

At Step 212, the sawblade carriage may be displaced toward the grinding disk until a tooth tip of a cutting tooth on the circular sawblade stops at the blade stop position by engaging the screw head on the blade contact screw. At Step 214, the blade stop carriage and blade stop arm of the blade stop device may be returned to the proximal home position on the carriage rail. At Step 216, the sawblade may be secured at the blade stop position and the machine door of the blade grinding machine may be closed.

At Step 218, a selected quantity or thickness of material to be removed from the outer surface of the tooth tip on each cutting tooth may be entered into a control panel on the blade grinding machine. At Step 220, the grinding disk of the grinding tool may approach the sawblade along the X-axis and contact the tooth tip. The contact point of the grinding disk with the tooth tip may serve as an X-axis reference point for the grinding disk. At Step 222, the grinding disk may rotate and remove a preselected quantity or thickness of material from the tooth tip which was programmed into the control panel of the blade grinding machine at Step 218.

At Step 224, Steps 204-222 may be repeated for all of the cutting teeth on the circular sawblade to remove the same quantity or thickness of material from the outer surface of the tooth tip on each cutting tooth. At Step 226. Steps 204-224 may be repeated for all of the cutting teeth on subsequent circular sawblades to remove the same quantity or thickness of material from the tooth tips of the cutting teeth of the circular sawblades.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A blade stop device for stopping a sawblade at a predetermined stopping point relative to a grinding disk on a grinding tool of a sawblade grinding machine, comprising:
a device mount frame configured for mounting with respect to the grinding disk on the grinding tool of the sawblade grinding machine;
a carriage rail carried by the device mount frame;
a blade stop carriage carried by and adjustable along the carriage rail between a home position and a blade stop position; and
a blade stop arm having an arm base carried by the blade stop carriage and a blade stop flange carried by the arm base.

2. The blade stop device of claim 1 further comprising a blade contact element carried by the blade stop flange.

3. The blade stop device of claim 2 wherein the blade contact element comprises a blade contact screw.

4. The blade stop device of claim 3 further comprising a screw opening in the blade stop flange, and wherein the blade contact screw comprises a screw shank threaded in the screw opening and a screw head carried by the screw shank.

5. The blade stop device of claim 1 wherein the device mount frame comprises a pair of side frame members, a proximal frame member and a distal frame member extending between the side frame members and a frame opening defined by and between the side frame members, the proximal frame member and the distal frame member.

6. The blade stop device of claim 5 further comprising a frame securing mechanism carried by the device mount frame.

7. The blade stop device of claim 6 wherein the frame securing mechanism comprises at least one frame mount bolt carried by the device mount frame.

8. The blade stop device of claim 7 wherein the at least one frame mount bolt comprises at least one side frame mount bolt carried by at least one of the pair of side frame members and at least one proximal frame mount bolt carried by the proximal frame member of the device mount frame.

9. The blade stop device of claim 1 further comprising a carriage switch carried by the device mount frame, the carriage switch closed when the blade stop carriage and blade stop arm are deployed in the proximal home position and the carriage switch opened when the blade stop carriage and blade stop arm are deployed in the blade stop position.

10. The blade stop device of claim 9 wherein the carriage switch comprises a proximal switch contact on the device mount frame and a distal switch contact on the blade stop arm, the distal switch contact on the blade stop arm contacts the proximal switch contact on the device mount frame to close the carriage switch when the blade stop carriage and blade stop arm are deployed in the home position and the distal switch contact disengages the proximal switch contact and opens the carriage switch when the blade stop carriage and blade stop arm are deployed in the blade stop position.

11. The blade stop device of claim 1 wherein the carriage rail comprises a frame mount rail segment generally coextensive with the device mount frame and an extending rail segment extending from the frame mount rail segment beyond the device mount frame.

12. The blade stop device of claim 11 wherein the carriage rail comprises a generally planar lower rail surface, a generally planar upper rail surface and a pair of concave side rail grooves extending into opposite sides and along at least a portion of the length of the carriage rail, the blade stop carriage configured to slidably interface with the side rail grooves in the carriage rail.

13. A blade stop device for mounting on a sawblade clamp in a machine interior of a sawblade grinding machine and stopping a sawblade at a predetermined stopping point relative to a grinding disk on a grinding tool in the machine interior, comprising:
  a device mount frame configured for mounting on the sawblade clamp in the machine interior of the sawblade grinding machine;
  a carriage rail carried by the device mount frame;
  a blade stop carriage carried by and adjustable along the carriage rail between a home position and a blade stop position; and
  a blade stop arm including:
    an arm base carried by the blade stop carriage;
    a proximal arm segment extending outwardly from the arm base;
    a middle arm segment extending perpendicularly from the proximal arm segment;
    a distal arm segment extending perpendicularly from the middle arm segment;
    a terminal arm segment extending perpendicularly from the distal arm segment; and
    a blade stop flange carried by the terminal arm segment.

14. The blade stop device of claim 13 further comprising a screw opening in the blade stop flange and a blade contact screw having a screw shank threaded in the screw opening and a screw head carried by the screw shank.

15. The blade stop device of claim 13 wherein the device mount frame comprises a pair of side frame members, a proximal frame member and a distal frame member extending between the side frame members and a frame opening defined by and between the side frame members, the proximal frame member and the distal frame member, the frame opening sized and configured to accommodate the sawblade clamp in the machine interior of the blade grinding machine.

16. The blade stop device of claim 15 further comprising a frame securing mechanism carried by the device mount frame, the frame securing mechanism including at least one side frame mount bolt carried by at least one of the pair of side frame members and at least one proximal frame mount bolt carried by the proximal frame member of the device mount frame.

17. The blade stop device of claim 13 further comprising a carriage switch having a proximal switch contact on the device mount frame and a distal switch contact on the blade stop arm, the distal switch contact on the blade stop arm contacts the proximal switch contact on the device mount frame to close the carriage switch when the blade stop carriage and blade stop arm are deployed in the home position and the distal switch contact disengages the proximal switch contact and opens the carriage switch when the blade stop carriage and blade stop arm are deployed in the blade stop position.

18. A method of stopping a sawblade at a predetermined stopping point relative to a grinding disk on a grinding tool of a sawblade grinding machine to facilitate consistent removal of a desired quantity or thickness of material from blade teeth on different sawblades, comprising:
  providing a blade stop device having a device mount frame, a carriage rail carried by the device mount frame, a blade stop carriage carried by and adjustable along the carriage rail between a home position and a blade stop position and a blade stop arm having an arm base carried by the blade stop carriage and a blade stop flange carried by the arm base;
  deploying the blade stop device in the machine interior of the sawblade grinding machine;
  deploying a sawblade in place on a sawblade carriage in the machine interior;
  displacing the blade stop carriage from a home position to a blade stop position on the carriage rail of the blade stop device;
  displacing the sawblade carriage with the sawblade toward the grinding disk on the grinding tool until the sawblade engages the blade stop flange on the blade stop arm of the blade stop device; and
  returning the blade stop carriage to the home position on the carriage rail.

19. The method of claim 18 wherein deploying the blade stop device in the machine interior of the sawblade grinding machine comprises deploying the device mount frame of the blade stop device on a sawblade clamp in the machine interior.

20. The method of claim 19 wherein deploying the blade stop device in the machine interior of the sawblade grinding machine comprises securing the device mount frame on the sawblade clamp by threading at least one frame mount bolt on the device mount frame against the sawblade clamp.

* * * * *